(12) United States Patent
Chen

(10) Patent No.: US 6,502,906 B1
(45) Date of Patent: Jan. 7, 2003

(54) BICYCLE WHEEL RIM FOR MOUNTING A BICYCLE TIRE WITHOUT AN INNER TIRE BODY

(75) Inventor: Chao-Ying Chen, Tainan Hsien (TW)

(73) Assignee: Alex Machine Industrial Co., Ltd., Taina Hsien (TW)

( * ) Notice: Subject to any disclaimer, the term of this patent is extended or adjusted under 35 U.S.C. 154(b) by 0 days.

(21) Appl. No.: 10/015,197

(22) Filed: Dec. 10, 2001

(51) Int. Cl.⁷ .................................................. B60B 1/02
(52) U.S. Cl. ........................................................ 301/58
(58) Field of Search .............................. 301/58, 95.101, 301/95.102, 95.104, 95.105, 95.106, 95.107, 95.109, 95.108, 55; 152/381.3, 381.6, 427

(56) References Cited

U.S. PATENT DOCUMENTS

| | | | | |
|---|---|---|---|---|
| 3,008,770 A | * | 11/1961 | Mueller | 152/58 |
| 4,351,382 A | * | 9/1982 | Corner et al. | 152/379.4 |
| 4,824,177 A | * | 4/1989 | Aloy | 152/384 |
| 6,070,948 A | * | 6/2000 | Chen | 301/58 |
| 6,186,598 B1 | * | 2/2001 | Chen | 301/58 |
| 6,216,758 B1 | * | 4/2001 | Chen | 152/379.4 |
| 6,237,662 B1 | * | 5/2001 | Thomasberg | 152/379.4 |
| 6,257,676 B1 | * | 7/2001 | Lacombe et al. | 301/58 |
| 6,425,641 B1 | * | 7/2002 | Herting | 301/58 |

* cited by examiner

Primary Examiner—S. Joseph Morano
Assistant Examiner—Long Bao Nguyen
(74) Attorney, Agent, or Firm—Townsend and Townsend and Crew LLP

(57) ABSTRACT

A bicycle wheel rim includes an annular connecting wall interconnecting left and right tire retaining walls. The connecting wall has left and right wall parts, each having an outer terminating edge adjacent to a respective tire retaining wall, and an inner terminating edge, and an intermediate wall part extending between the inner terminating edges and indented radially and inwardly to define an annular receiving groove. Each of the left and right wall parts has a radial outer surface formed with an annular rib such that the radial outer surface is defined with an outer section between the rib and the outer terminating edge, and a flat inner section between the rib and the inner terminating edge. The rib has first and second stop surfaces connected respectively to the inner and outer sections.

6 Claims, 5 Drawing Sheets

BICYCLE WHEEL RIM FOR MOUNTING A BICYCLE TIRE WITHOUT AN INNER TIRE BODY

BACKGROUND OF THE INVENTION

1. Field of the Invention

The present invention relates to a bicycle wheel rim adapted for mounting a bicycle tire without an inner tire body, more particularly to a bicycle wheel rim which can facilitate inflation of the bicycle tire.

2. Description of the Related Art

FIG. 1 illustrates a conventional bicycle wheel rim 1 for mounting a bicycle tire 2 that does not require an inner tire body. The bicycle tire 2 has left and right abutment edges 21. The wheel rim 1 has left and right annular tire retaining walls 11, and an annular connecting wall 12. The connecting wall 12 has left and right wall parts 123, and an indented intermediate wall part 122 that defines an annular receiving groove 126. The intermediate wall part 122 has a pair of curved wall portions 125a connected respectively to the left and right wall parts 121. Each of the curved wall portions 125a has a convex surface 125 connected to the intermediate wall part 122, and an inclined surface 124 connected to the respective one of the left and right wall parts 123.

During installation, the bicycle tire 2 is first sleeved on the wheel rim 1 such that the abutment edges 21 are initially received in the receiving groove 126 to permit subsequent inflation of the bicycle tire 2 via a valve unit (not shown) mounted on the wheel rim 1. Before inflation, the bicycle tire 2 is in a state indicated by the phantom lines in FIG. 1. During inflation with the use of a high pressure air compressor, the abutment edges 21 slide respectively along the convex surfaces 125, and move past the convex surfaces 125 to reach the left and right wall parts 121 almost simultaneously. However, when the bicycle tire 2 is inflated using a manually operable or low pressure air compressor, points on the abutment edges 21 along the length thereof normally do not move at the same time on the convex surfaces 125. As a result, the bicycle tire 2 may be twisted during inflation, and air leakage may occur.

Moreover, due to the inclined surfaces 124 that are connected to the left and right wall parts 123, it is possible that one of the abutment edges 21, or a part of any of the abutment edges 21, will move past the adjacent inclined surface 124 and toward the receiving groove 126 when the bicycle tire 2 runs into an obstacle. Secure retention of the bicycle tire 2 on the conventional bicycle wheel rim 1 cannot be ensured.

SUMMARY OF THE INVENTION

Therefore, the main object of the present invention is to provide a bicycle wheel rim which can facilitate inflation of a bicycle tire even when a low pressure or manually operable air compressor is in use.

Accordingly, the bicycle wheel rim of the present invention is adapted for mounting an inflatable bicycle tire with left and right abutment edges, and includes an annular rim body with a central axis. The rim body includes spaced-apart annular left and right tire retaining walls, and an annular connecting wall extending between and interconnecting the left and right tire retaining walls. Each of the left and right tire retaining walls has a radial outer end distal from the central axis and adapted to engage a respective one of the left and right abutment edges of the bicycle tire. The connecting wall cooperates with the left and right tire retaining walls to confine a tire retaining space adapted for retaining the bicycle tire. The connecting wall has left and right wall parts, each having an outer terminating edge adjacent to a respective one of the left and right tire retaining walls, and an inner terminating edge opposite to the outer terminating edge. The connecting wall further has an intermediate wall part extending between and interconnecting the inner terminating edges of the left and right wall parts. The intermediate wall part is indented radially and inwardly relative to the left and right wall parts so as to define an annular receiving groove that opens radially and outwardly and that is communicated with the tire retaining space. The receiving groove is adapted to receive the abutment edges of the bicycle tire upon installation of the bicycle tire on the rim body. Each of the left and right wall parts has a radial outer surface which faces radially and outwardly and which is formed with an annular rib that extends longitudinally along the respective one of the left and right wall parts such that the radial outer surface is defined with an outer section extending between the rib and the outer terminating edge, and a flat inner section extending between the rib and the inner terminating edge. The rib projects radially and outwardly relative to the inner and outer sections of the radial outer surface, and has a first stop surface connected to the inner section and a second stop surface connected to the outer section.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
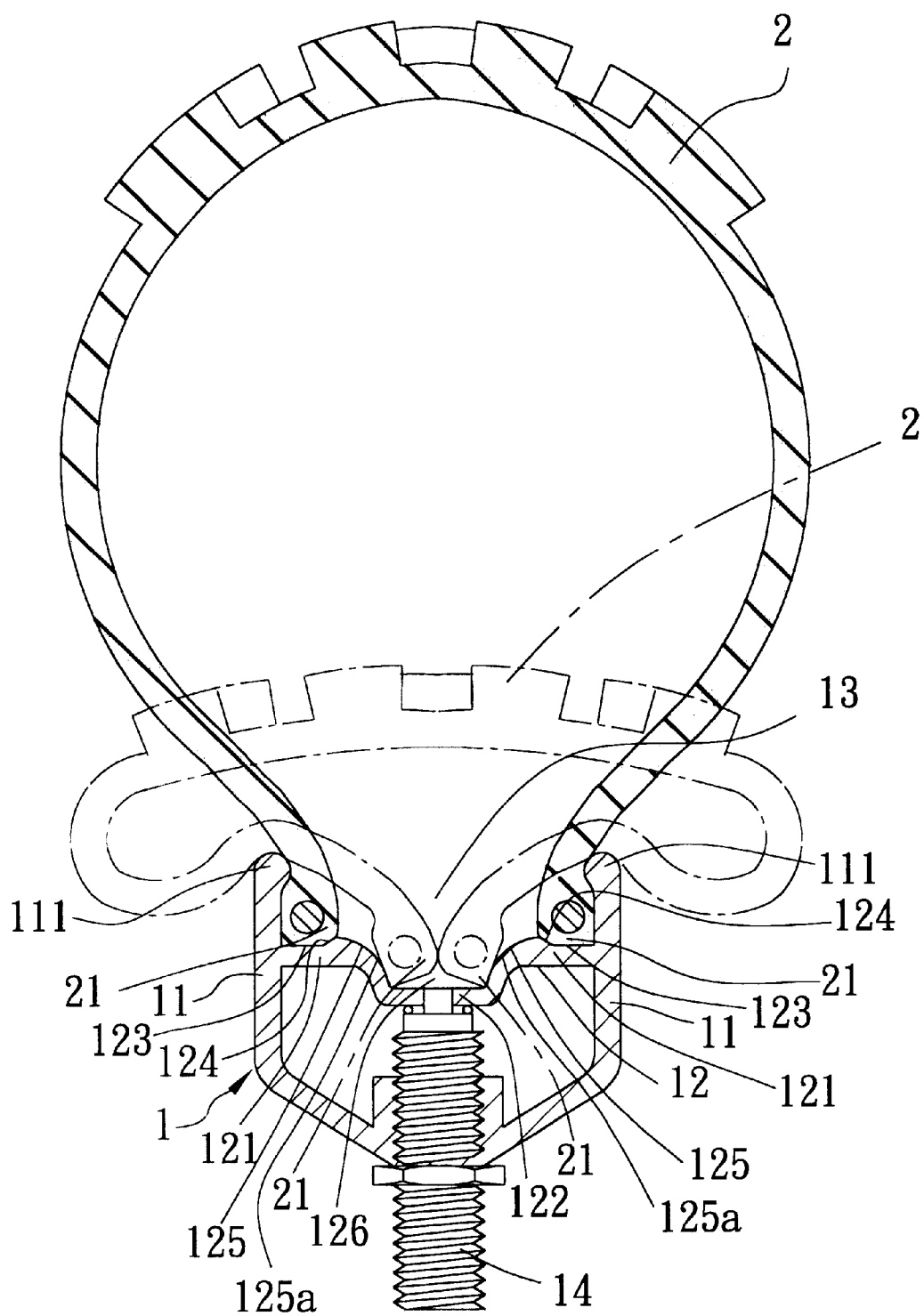
FIG. 1 is a cross-sectional view of a conventional bicycle wheel rim that is installed with a bicycle tire.
Figure 2:
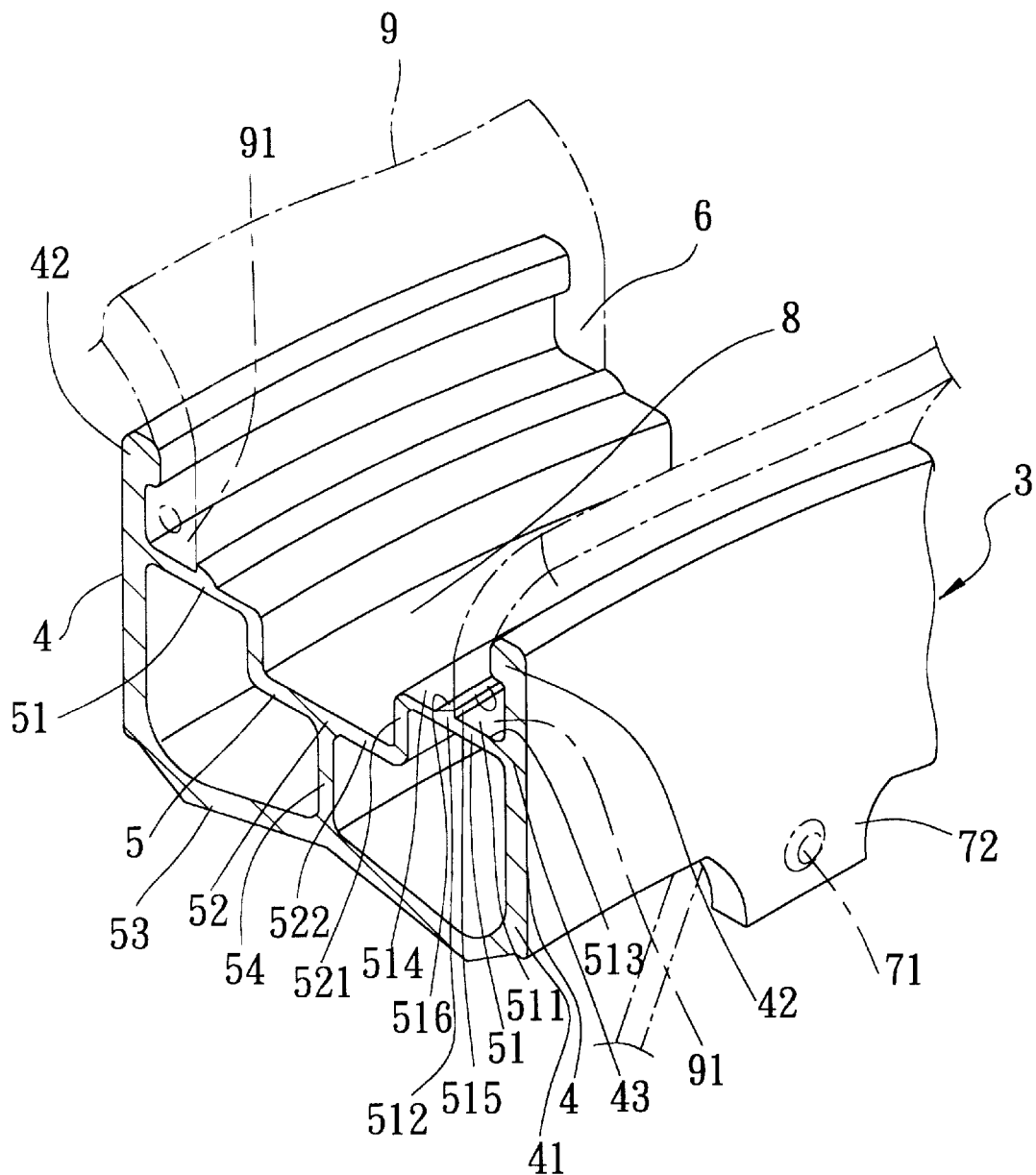
FIG. 2 is a fragmentary perspective view of a preferred embodiment of the bicycle wheel rim of the present invention.
Figure 3:
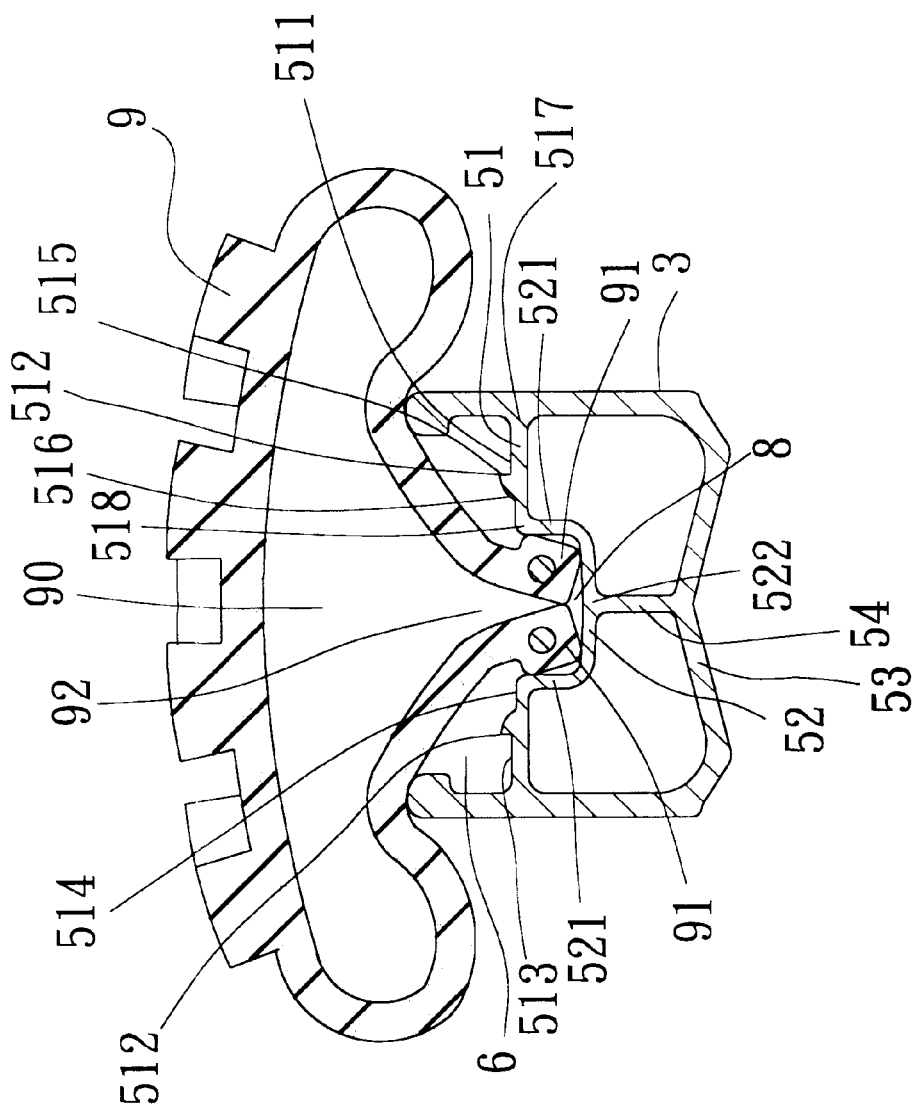
FIG. 3 is a cross-sectional view of the preferred embodiment with a bicycle tire installed thereon before inflation of the bicycle tire.

Referring to FIGS. 2 and 3, the preferred embodiment of the bicycle wheel rim of the present invention is adapted for mounting a bicycle tire 9 without the need for an inner tire body. The bicycle tire 9 is in the form of a hollow annular body which confines an inflation chamber 90 therein and which has left and right longitudinally extending abutment edges 91 that cooperatively define an opening 92 communicated with the inflation chamber 90.

The bicycle wheel rim of the present embodiment includes an annular rim body 3 with a central axis (not shown). The rim body 3 includes annular left and right tire retaining walls 4 which extend radially and which are spaced-apart from each other. Each of the tire retaining walls 4 has a radial inner end 41 proximate to the central axis, a radial outer end 42 distal from the central axis, and an intermediate portion 43 between the radial inner and radial outer ends 41, 42. The radial outer ends 42 of the tire retaining walls 4 are bent toward each other and are adapted to engage the abutment edges 91 of the bicycle tire 9. The rim body 3 further includes an annular base wall 53 extending between and interconnecting the radial inner ends 41 of the tire retaining walls 4, an annular connecting wall 5 extending between and interconnecting the intermediate portions 43 of the tire retaining walls 4, and an annular reinforcing wall 54 that extends radially between the base wall 53 and the connecting wall 5 for reinforcing the strength of the rim body 3.

The connecting wall 5 cooperates with the left and right tire retaining walls 4 to confine a tire retaining space 6 adapted for retaining the bicycle tire 9. Each of the left and right tire retaining walls 4 is formed with a plurality of angularly displaced spoke mounting projections 72 which project radially and inwardly from the radial inner end 41 of the respective one of the tire retaining walls 4. Each of the spoke mounting projections 72 is adapted for mounting a spoke fastener 71 thereon.

The connecting wall 5 includes left and right wall parts 51, and an intermediate wall part 52 extending between and interconnecting the left and right wall parts 51. Each of the left and right wall parts 51 has an outer terminating edge 517 adjacent and connected to a respective one of the left and right tire retaining walls 4, an inner terminating edge 518 opposite to the outer terminating edge 517, and a radial outer surface 511 which faces radially and outwardly. The radial outer surface 511 is formed with an annular stop rib 512 which extends longitudinally along the respective one of the left and right wall parts 51 such that the radial outer surface 511 is defined with a flat outer section 513 extending between the rib 512 and the outer terminating edge 517, and a flat inner section 514 extending between the rib 512 and the inner terminating edge 518. The inner section 514 extends from the inner terminating edge 518 to the rib 512 in a direction parallel to the central axis. Similarly, the outer section 513 extends from the rib 512 to the outer terminating edge 517 in a direction parallel to the central axis. In FIG. 3, the wheel rim is disposed such that the central axis (not shown) thereof is oriented horizontally. The inner and outer sections 514, 513 of the radial outer surface 511 of each of the left and right wall parts 51 are shown in FIG. 3 to extend horizontally. The outer sections 513 of the radial outer surfaces 511 are disposed radially and outwardly relative to the inner sections 514. The rib 512 on each of the left and right wall parts 51 projects radially and outwardly relative to the inner and outer sections 514, 513 of the radial outer surface 511 of the corresponding wall part 51, and has a convex first stop surface 516 connected to the inner section 514, and a second stop surface 515 connected to the outer section 513. The second stop surface 515 is perpendicular to the outer section 513 of the radial outer surface 511.

The intermediate wall part 52 extends between the inner terminating edges 518 of the left and right wall parts 51. The intermediate wall part 52 is indented radially and inwardly relative to the left and right wall parts 51 so as to define an annular receiving groove 8 that opens radially and outwardly and that is communicated with the tire retaining space 6. The intermediate wall part 52 is U-shaped in cross-section, and includes left and right side portions 521 connected respectively to the inner terminating edges 518 of the left and right wall parts 51, and a bottom portion 522 which extends transversely between the side portions 521 and which is connected to the base wall 53 via the reinforcing wall 54. Each of the left and right side portions 521 is perpendicular to a respective one of the left and right wall parts 51.

Figure 4:
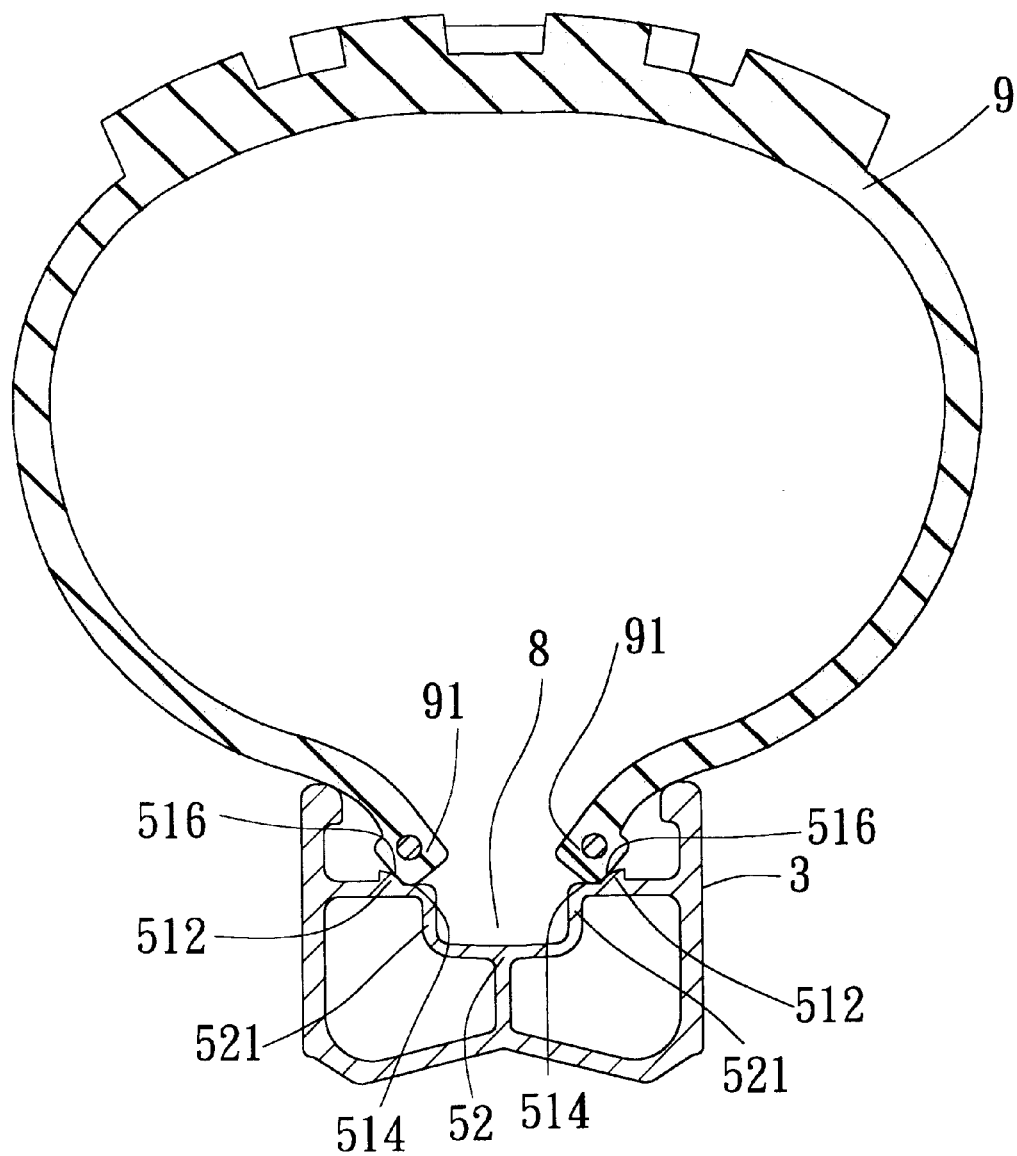
FIG. 4 is another cross-sectional view of the preferred embodiment during inflation of the bicycle tire installed thereon.
Figure 5:
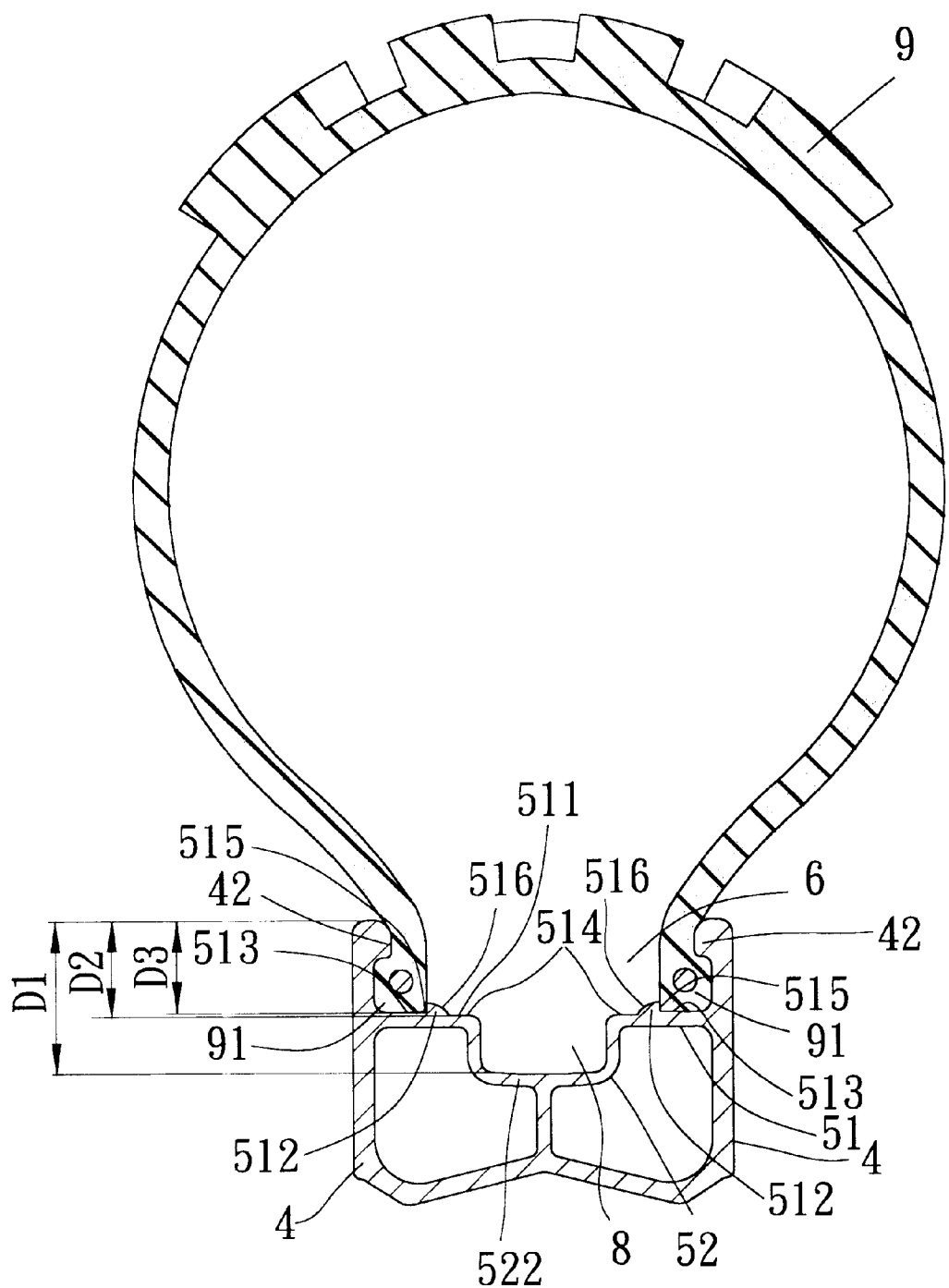
FIG. 5 is yet another cross-sectional view of the preferred embodiment after inflation of the bicycle tire.

Referring to FIGS. 3 to 5, to install the bicycle tire 9 on the wheel rim of the present embodiment, the abutment edges 91 of the bicycle tire 9 are extended into the receiving groove 8 for temporary retention therein before inflation of the bicycle tire 9. Referring to FIG. 4, inflation of the bicycle tire 9 is conducted using an air compressor via a valve device (not shown) mounted on the wheel rim. During the inflation operation, air pressure within the bicycle tire 9 gradually increases. When the air pressure in the bicycle tire 9 reaches a certain value, the abutment edges 91 are forced to move over the side portions 521 of the indented intermediate wall part 52 and reach the inner sections 514 of the radial outer surfaces 511 of the left and right wall parts 51. The abutment edges 91 then abut against the first stop surfaces 516 of the rib 512, and are temporarily retained on the inner sections 514. Once the air pressure in the bicycle tire 9 reaches another higher value, referring to FIG. 5, the left and right abutment edges 91 move simultaneously over the first stop surfaces 516 of the ribs 512 and reach the outer sections 513 of the radial outer surfaces 511 of the left and right wall parts 51, where the abutment edges 91 engage the radial outer ends 42 of the left and right tire retaining walls 4 and abut against the second stop surfaces 515 of the ribs 512. It is found that the arrangement as such permits the abutment edges 91 of the bicycle tire 9 to move synchronously from the receiving groove 8, past the inner sections 514 of the radial outer surfaces 511 of the left and right wall parts 51, and reach the outer sections 513 of the radial outer surfaces 511 even when the bicycle tire 9 is inflated using a low pressure or manually operable air compressor. The bicycle tire 9 is not twisted, and air leakage does not occur during the inflation operation.

The receiving groove 8 has a first depth (D1) which is measured from the bottom portion 522 of the intermediate wall part 52 to the radial outer ends 42 of the left and right tire retaining walls 4. Each of the left and right wall parts 51 has a second depth (D2) which is measured from the inner section 514 of the radial outer surface 511 to the radial outer ends 42 of the left and right tire retaining walls 4. Each of the left and right wall parts 51 further has a third depth (D3) which is measured from the outer section 513 of the radial outer surface 511 to the radial outer ends 42 of the left and right tire retaining walls 4. The depth (D1) of the receiving groove 8 is deeper than the depth (D2) of the inner sections 514, which, in turn, is deeper than the depth (D3) of the outer sections 513. This facilitates smooth climbing of the abutment edges 91 of the bicycle tire 9 in a radial outward direction during inflation of the bicycle tire 9.

Furthermore, since the second stop surfaces 515 of the ribs 512 are formed to be perpendicular to the outer sections 513 of the radial outer surfaces 511, the abutment edges 91 can be prevented from moving over the ribs 512 and can be retained securely between the ribs 512 and the radial outer ends 42 of the tire retaining walls 4.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A bicycle wheel rim adapted for mounting an inflatable bicycle tire with left and right abutment edges, said bicycle wheel rim comprising an annular rim body with a central axis, said rim body including:

annular left and right tire retaining walls which are spaced-apart from each other, each of said tire retaining walls having a radial outer end distal from the central axis and adapted to engage a respective one of the left and right abutment edges of the bicycle tire; and an annular connecting wall extending between and interconnecting said left and right tire retaining walls, said connecting wall cooperating with said left and right tire retaining walls to confine a tire retaining space adapted for retaining the bicycle tire, said connecting wall having left and right wall parts, each having an outer terminating edge adjacent to a respective one of said left and right tire retaining walls, and an inner terminating edge opposite to said outer terminating edge, said connecting wall further having an intermediate wall part extending between and interconnecting said inner terminating edges of said left and right wall parts, said intermediate wall part being indented radially and inwardly relative to said left and right wall parts so as to define an annular receiving groove that opens radially and outwardly and that is communicated with said tire retaining space, said receiving groove being adapted to receive the abutment edges of the bicycle tire upon installation of the bicycle tire on said rim body, each of said left and right wall parts having a radial outer surface which faces radially and outwardly and which is formed with an annular rib that extends longitudinally along the respective one of said left and right wall parts such that said radial outer surface is defined with an outer section extending between said rib and said outer terminating edge, and a flat inner section extending between said rib and said inner terminating edge, said rib projecting radially and outwardly relative to said inner and outer sections of said radial outer surface and having a first stop surface connected to said inner section and a second stop surface connected to said outer section.

2. The bicycle wheel rim as claimed in claim 1, wherein said inner section of said radial outer surface of each of said left and right wall parts extends from said inner terminating edge to said rib in a direction parallel to the central axis.

3. The bicycle wheel rim as claimed in claim 2, wherein said first stop surface of said rib is convex, and said second stop surface of said rib is perpendicular to said outer section of said radial outer surface.

4. The bicycle wheel rim as claimed in claim 1, wherein said intermediate wall part of said connecting wall has a U-shaped cross-section with left and right side portions connected respectively to said inner terminating edges of said left and right wall parts, and a bottom portion extending transversely between said left and right side portions.

5. The bicycle wheel rim as claimed in claim 4, wherein said left and right side portions of said intermediate wall part are perpendicular to said left and right wall parts, respectively.

6. The bicycle wheel rim as claimed in claim 4, wherein said receiving groove has a first depth measured from said bottom portion of said intermediate wall part to said radial outer ends of said left and right tire retaining walls, each of said left and right wall parts of said connecting wall having a second depth measured from said inner section of said radial outer surface to said radial outer ends of said left and right tire retaining walls, each of said left and right wall parts further having a third depth measured from said outer section of said radial outer surface to said radial outer ends of said left and right tire retaining walls, the first depth being deeper than the second depth, the second depth being deeper than the third depth.

\* \* \* \* \*